(12) United States Patent
Alharbi et al.

(10) Patent No.: US 7,948,881 B2
(45) Date of Patent: May 24, 2011

(54) DISTRIBUTED BANDWIDTH ALLOCATION FOR RESILIENT PACKET RING NETWORKS

(75) Inventors: Fahd Alharbi, Jeddah (SA); Nirwan Ansari, Montville, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 820 days.

(21) Appl. No.: 11/403,521

(22) Filed: Apr. 13, 2006

(65) Prior Publication Data

US 2006/0250986 A1 Nov. 9, 2006

Related U.S. Application Data

(60) Provisional application No. 60/671,974, filed on Apr. 15, 2005.

(51) Int. Cl.
 *H04L 12/26* (2006.01)
 *G06F 15/16* (2006.01)
(52) U.S. Cl. .......................... 370/230; 370/235; 709/251
(58) Field of Classification Search .................. 370/230, 370/235, 258, 468, 907; 709/223, 251; 398/59
 See application file for complete search history.

(56) References Cited

U.S. PATENT DOCUMENTS

| | | | |
|---|---|---|---|
| 6,052,361 A * | 4/2000 | Ansari et al. | 370/232 |
| 6,314,110 B1 * | 11/2001 | Chin et al. | 370/468 |
| 6,674,717 B1 * | 1/2004 | Duong-van et al. | 370/230 |
| 6,816,494 B1 * | 11/2004 | Raza | 370/395.41 |
| 7,016,969 B1 * | 3/2006 | Uzun et al. | 709/233 |
| 2002/0041606 A1 * | 4/2002 | Chin et al. | 370/468 |
| 2003/0058802 A1 * | 3/2003 | Jones et al. | 370/252 |
| 2003/0112829 A1 * | 6/2003 | Sridhar | 370/522 |
| 2003/0163593 A1 * | 8/2003 | Knightly | 709/251 |
| 2004/0032826 A1 * | 2/2004 | Sridhar | 370/222 |
| 2004/0100984 A1 * | 5/2004 | Nam et al. | 370/438 |
| 2004/0114520 A1 * | 6/2004 | Davis | 370/236.1 |
| 2005/0100031 A1 * | 5/2005 | Choe et al. | 370/404 |
| 2006/0106672 A1 * | 5/2006 | Mo et al. | 705/14 |

OTHER PUBLICATIONS

Peng Yue, "High Performance Fair Bandwidth Allocation Algorithm for Resilient Packet Ring," Mar. 27, 2003, 17th Conference on Advanced Information Network and Applications, pp. 415-420.*
Alharbi, F., "A Novel Fairness Algorithm for Resilient Packet Ring Networks with Low Computational and Hardware Complexity," Apr. 25, 2004, 13th IEEE Workshop on Local Metropolitan Area Networks, pp. 11-16.*
Fahd Alharbi, "Distributed Bandwidth Allocation for Resilient Packet Ring Networks," Oct. 5, 2005 (available online Mar. 2, 2005), vol. 49, Iss. 2, pp. 161-171.*
V. Gambiroza, "High Performance Fair Bandwidth Allocation for Resilient Packet Rings," Proceedings of the 15th ITC Specialist Seminar, 2002, p. 1-12.*
IEEE Standard 802.17: Resilient Packet Ring (RPR) Access Method and Physical Layer Specification; 2004; pp. 1-664.

(Continued)

*Primary Examiner* — Dang T Ton
*Assistant Examiner* — Ryan C Kavleski
(74) *Attorney, Agent, or Firm* — Connolly Bove Lodge & Hutz

(57) ABSTRACT

Methods and apparatus provide for allocating bandwidth in a resilient packet ring (RPR), including: determining a relationship between an arrival rate $A(n)$ as a function of a fairness rate $F_k(n)$ of a kth node of the RPR over time; computing an estimate of a slope $-M$ of the relationship $A(F_k(n))$ at time n; and computing a next fairness rate $F_k(n+1)$ of the kth node as a function of the slope M at time n+1.

22 Claims, 10 Drawing Sheets

OTHER PUBLICATIONS

Davik et al.; IEEE 802.17 Resilient Packet Ring Background and Overview; Simula Research Laboratory, Technical Report Nov. 2003; Dec. 2003; pp. 1-20.

Davik et al.; IEEE 802.17 Resilient Packet Ring Tutorial; IEEE Communications Magazine; Mar. 2004; pp. 112-118.

Gambiroza et al.; The IEEE 802.17 Media Access Protocol for High-Speed Metropolitan-Area Resilient Packet Rings; IEEE Network, 18(3):815, May 2004, pp. 8-15.

Davik et al.; The Stability of the Resilient Packet Ring Agressive Fairness Algorithm; Mar. 19, 2004; pp. 17-22.

Gambiroza et al.; Design, Analysis, and Implementation of DVSR: A Fair High-Performance Protocol for Packet Rings; IEEE/ACM Transactions on Networking, vol. 12, No. 1; Feb. 2004; pp. 85-102.

Fahmy et al.; On Determining the Fair Bandwidth Share for ABR Connections in ATM Networks; Proceeding of the IEEE ICC98, vol. 3, Jun. 1998, pp. 1485-1491.

Bertsekas et al.; Parallel And Distributed Computation; Prentice-Hall, 1989, pp. 199-202.

Gjessing et al.; The Simula RPR SImulator Written i Java; Simular Research Laboratory Technical Report Dec. 2003; Jul. 14, 2003; pp. 1-15.

Gambiroza et al.; High Performance Fair Bandwidth Allocation for Resilient Packet Rings; In Proceedings of 15th ITC Specialist Seminar on Traffic Engineering and Traffic Management, pp. 1-12.

McKeown et al.; Achieving 100% Throughput in an input-Queued Switch; 1996 IEEE; pp. 296-302.

\* cited by examiner

DISTRIBUTED BANDWIDTH ALLOCATION FOR RESILIENT PACKET RING NETWORKS

CROSS REFERENCE TO RELATED APPLICATION

This application claims the benefit of U.S. Provisional Patent Application No.: 60/671,974, filed Apr. 15, 2005, the entire disclosure of which is hereby incorporated by reference.

BACKGROUND

The present invention relates to methods and apparatus for allocating bandwidth among the nodes of a Resilient Packet Ring (RPR) network.

Rings are the most prevalent metro technologies because of their protection and fault tolerance properties, but the current metropolitan ring networking technologies exhibit several limitations. In a SONET ring, each node is granted with the minimum fair share, but it is not possible to reclaim the unused bandwidth; moreover, 50% of the potentially available bandwidth is reserved for protection, thus resulting in poor utilization. On the other hand, a Gigabit Ethernet ring assures full statistical multiplexing at the expense of fairness. The RPR is used to mitigate the respective underutilization and unfairness problems associated with the current SONET and Ethernet technologies.

The RPR is defined under IEEE 802.17 and has been proposed as a high-speed backbone technology for metropolitan area networks. The key performance objectives of RPR are to achieve high bandwidth utilization, optimum spatial reuse on the dual rings, and fairness. The challenge has been to design an algorithm that can react dynamically to the traffic flows in achieving these objectives. The RPR fairness algorithm is comparatively simple, but it has some limitations that have heretofore been unsolved. One of these problems is that the amount of bandwidth allocated by the algorithm oscillates severely under unbalanced traffic scenarios. These oscillations represent a barrier to achieving spatial reuse and high bandwidth utilization.

DVSR was another algorithm proposed to solve the fairness issue with no oscillation at the steady state, but at the expense of a high computational complexity $O(N\log N)$, where N is the number of nodes in the ring.

The conventional SONET, Ethernet, and RPR technologies do not balance the competing underutilization and unfairness problems as well as addressing cost and complexity issues. Accordingly, there is a need in the art for a new approach to allocating bandwidth in a resilient packet ring environment.

SUMMARY OF THE INVENTION

In accordance with one or more aspects of the present invention, a distributed bandwidth allocation (DBA) algorithm is employed to allocate bandwidth fairly to RPR nodes with a relatively low computational complexity $O(1)$. The DBA algorithm converges to the maximum-minimum fairness in a few round trip times with substantially no oscillation at steady state.

In accordance with one or more embodiments of the present invention, methods and apparatus for allocating bandwidth in a RPR provide for: determining a relationship between an arrival rate $A(n)$ as a function of a fairness rate $F_k(n)$ of a kth node of the RPR over time; computing an estimate of a slope M of the relationship $A(F_k(n))$ at time n; and computing a next fairness rate $F_k(n+1)$ of the kth node as a function of the slope M at time n+1. The arrival rate $A(n)$ may be expressed as: $A(n)=F_k(n)\Sigma\rho_i$ (i=1 to M'), where M' is the number of flows traversing a forward link k into the kth node of the RPR. The slope M may be expressed as at least one of: $M=A(n)/F_k(n)$; and $M=\Sigma\rho_i$ (i=1 to M'), where M' is a number of flows traversing a forward link k into the kth node of the RPR.

The step of computing a next fairness rate $F_k(n+1)$ may include substantially maximizing the $F_k(n+1)$ while constraining a resultant next arrival rate $A(n+1)$. For example, the constraint on the next arrival rate $A(n+1)$ may be expressed as follows: $A(n+1)\leq C$. By way of example, the step of computing the next fairness rate $F_k(n+1)$ may be expressed as follows: $F_k(n+1)=F_k(n)+(1/M)(C-A(n))$, where C is at least a link capacity of a forward link k into the kth node of the RPR. C may alternatively be the link capacity less any reserved bandwidth of other data traffic (e.g., where the other data traffic is higher priority traffic).

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the embodiments of the invention, there are shown in the drawings forms that are presently preferred, it being understood, however, that the embodiments of the invention are not limited to the precise arrangements and instrumentalities shown.

DETAILED DESCRIPTION OF THE PRESENT INVENTION

Figure 1:
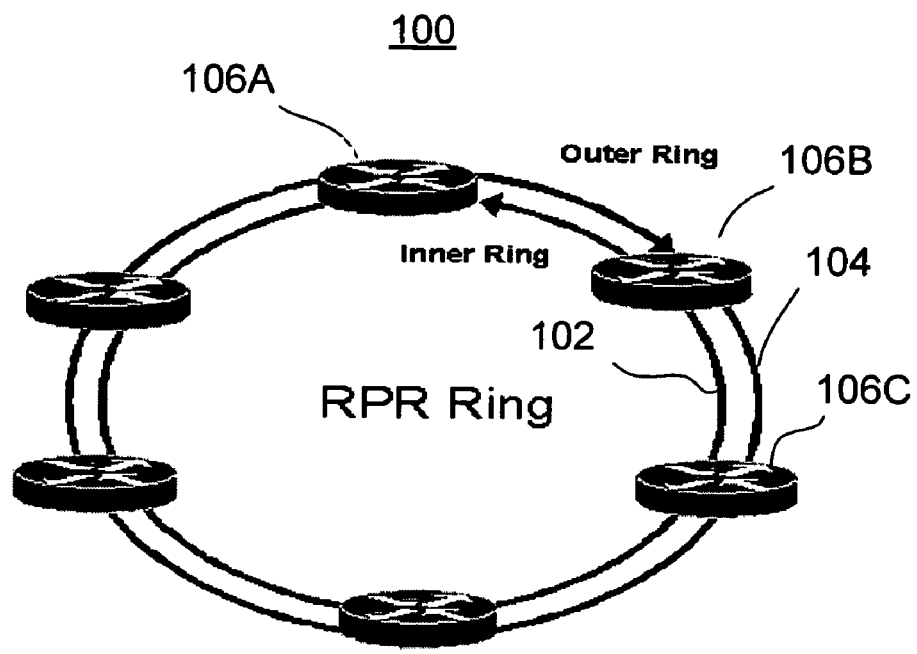
FIG. 1 is a block diagram of an RPR ring in accordance with one or more embodiments of the present invention.

With reference to the drawings, wherein like numerals indicate like elements, there is shown in FIG. 1 an RPR ring 100 in accordance with one or more embodiments of the present invention. The RPR ring 100 includes two rotating rings: one is referred to as the inner ringlet 102, and the other the outer ringlet 104. The inner and outer ringlets 102, 104 traverse a plurality of nodes 106A, 106B, 106C, etc. Notably, the RPR 100 may share with the SONET ring the ability to provide fast recovery from link and node failures, while also exhibiting the cost and simplicity characteristics of the Ethernet ring.

The RPR 100 defines three service classes of user traffic: Class A with guaranteed rate and jitter; Class B with a committed information rate (CIR) and bounded delay and jitter; and Class C, which is the best effort traffic. The RPR 100 requires that packets be removed from the ring 100 at the destination so that different segments of the ring 100 can be used at the same time for different flows. As a result, a spatial reuse feature is achieved, whereby concurrent transfers are made over the same ring. Enabling the spatial reuse feature introduces a challenge of guaranteeing fairness among the nodes sharing the same link.

Figure 2:
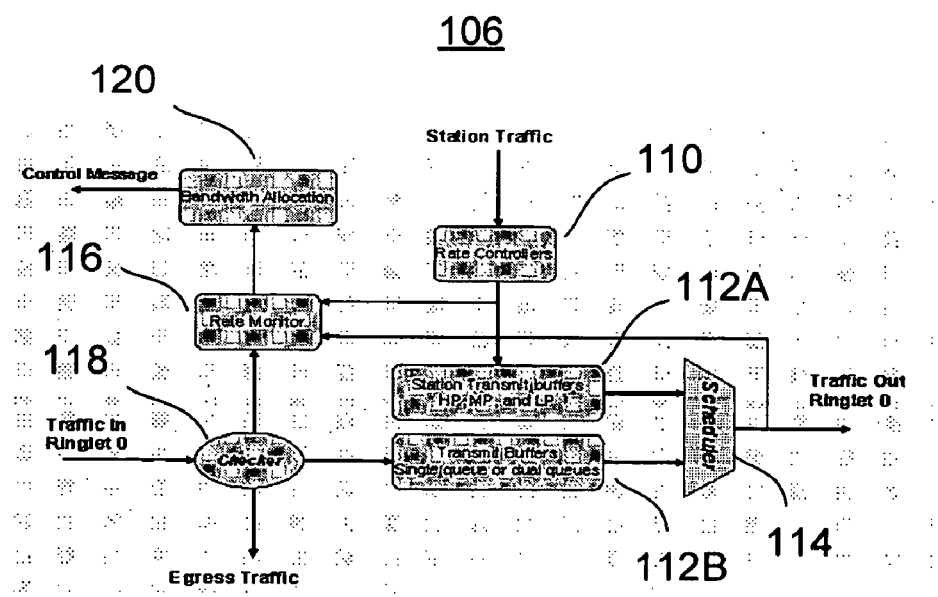
FIG. 2 is a partial block diagram and partial flow diagram of a given node of the RPR ring of FIG. 1.

FIG. 2 is a partial block diagram and partial flow diagram of a given node 106 of the ring 100. The node 106 includes hardware and software capable of performing the functions of ingress data measurements, congestion, and bandwidth allocation. The hardware and software includes one or more rate controllers 110, one or more transmit buffers 112A, 112B, a scheduler 114, a rate monitor 116, a checker, and a bandwidth allocation circuit 120. These functional units operate to perform a flow control in the RPR 100 that enables a congested node (e.g., node 106B) to send a fairness message (derived according to measurements that it makes) to the upstream nodes 106A, etc. to throttle ingress data rates in order to eliminate the state of congestion and apply fairness among all the participating nodes 106.

The node 106 uses the rate controller 110 to throttle the traffic entering the ring (on a per-destination basis) to support virtual destination queuing and avoid head-of-line blocking. The rate monitor 116 measures traffic (e.g., via counting bytes), including at least one of traffic in, traffic out, and station traffic (e.g., transit traffic and node traffic). The checker 118 shunts egress traffic out of the node 106 and is preferably not counted. The traffic measurements are used by bandwidth allocation circuit (or unit) 120, which is operable to apply a fairness algorithm to compute a fair rate F(n) which is fed-back to the upstream nodes 106 in the form of a control message. Nodes 106 that receive the control message will use the control message information with their local information to throttle their rates accordingly.

Figure 3A:
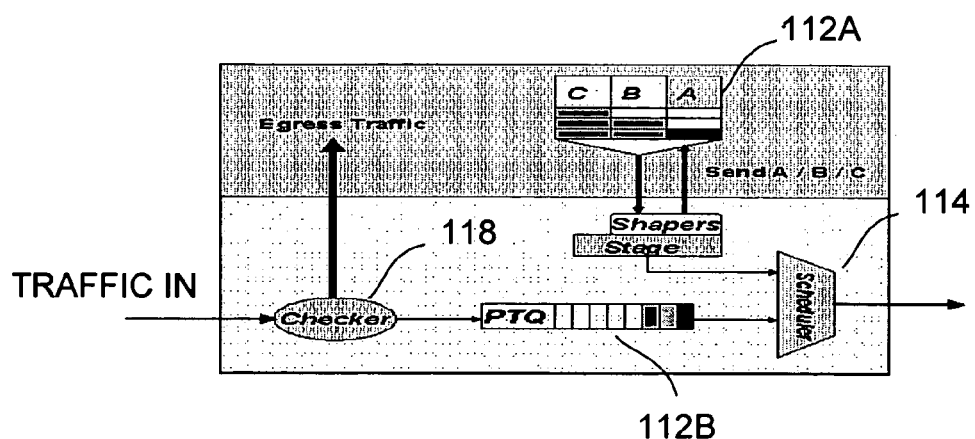
FIG. 3A is a partial block diagram of a portion of the node of FIG. 2 in accordance with one or more embodiments.
Figure 3B:
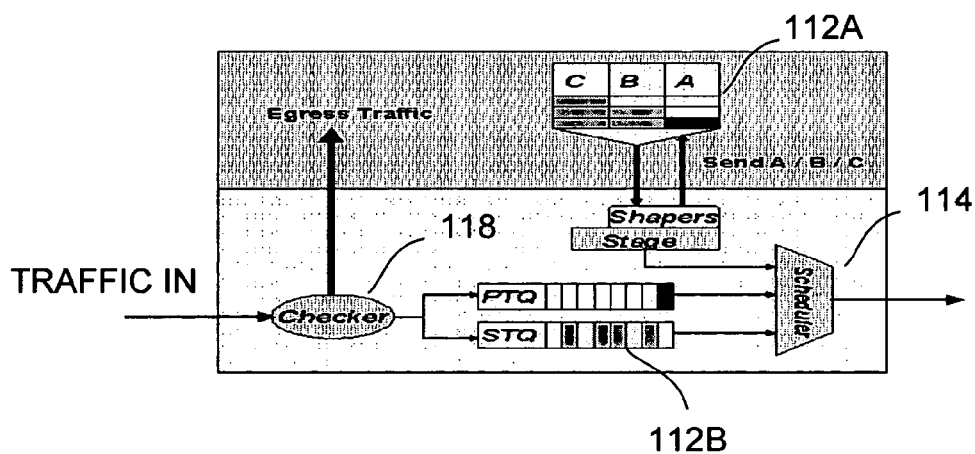
FIG. 3B is a partial block diagram of a portion of the node of FIG. 2 in accordance with one or more alternative embodiments.

To ensure hardware simplicity and the preservation of loss-less transit path, the node 106 preferably does not include per-ingress or per-flow queues on the transit path. Instead, the node 106 includes two scheduling modes: a single-queue mode and a dual-queue mode. In the single-queue mode, the node 106 may be operational as illustrated in FIG. 3A, where the transmit buffer 112B includes a single FIFO function (primary transit queue, PTQ) and the transit traffic has strict priority over the station traffic. On the other hand, in the dual-queue mode the node 106 may be operational as illustrated in FIG. 3B, where the transmit buffer 112B includes two queues: primary transit queue PTQ for Class A traffic, and secondary transit queue STQ for Class B and Class C traffic. In this mode, the PTQ is preferably served first. When the PTQ is empty, the STQ has strict priority over the station traffic when the queue length exceeds the STQ threshold. Otherwise, the station traffic is served in the following order: Class A, then Class B. If the station (node) has no Class A or B traffic, then Class C traffic will be served.

Herein the best effort (Class C) traffic is considered in which flows share the available bandwidth at the congested link in a weighted manner.

The RPR fairness algorithm implemented in the nodes 106 operates in two modes: the aggressive mode and the conservative mode. In both modes, each node 106 measures at the output of the scheduler 114 the byte count of all serviced transit traffic (called forward-rate) and the byte count of all serviced station traffic (called my-rate). These measurements are preferably taken over a fixed aging-interval. Both modes have the same measurements, but use them differently in detecting congestion and computing fair rates.

In the aggressive mode (RPR-AM), the transit path has a dual-queue. A given node k (such as node 106B) is considered to be congested when either: STQ-depth[k]>low-threshold, where the low-threshold is equal to ⅛ of the STQ size; or my-rate[k]+forward-rate[k]>unreserved-rate, where the unreserved-rate is equal to the link capacity minus the reserved rate for the high priority class traffic.

When the node k 106B is congested, it calculates its local-fair-rate as the normalized value of its own my-rate value, and then sends a fairness control message to upstream nodes 106 containing my-rate. On the other hand, if the node k 106B is not congested, it sends a NULL value as the fairness control message to inform the upstream nodes 106 to increase their rates.

In the conservative mode (RPR-CM), the transit path has a single queue and each node 106 has an access timer to measure the time between its transmitted packets. Here, the node k is considered to be congested when either the access time expires, or my-rate[k]+forward-rate[k]>low-threshold, where the low threshold is equal to 0.8 of the link capacity.

In the conservative mode, each node 106 not only measures my-rate and forward-rate, but also measures the number of active nodes where a node i will be counted active if at least a single packet was received from node i during the aging interval. If node k is congested in this aging interval, but was not congested in the previous interval, it will send a fairness control message containing the fair rate equal to the unreserved bandwidth divided by the number of active nodes. If node k continues to be congested, then it sends a normalized local-fair-rate depending on the value of the sum of my-rate [k] and forward-rate[k]. If this value is less than the low threshold, the local-fair-rate will ramp up. On the other hand, the local-fair rate will ramp down when the sum is greater than the high threshold, which is 0.95 of the unreserved-rate.

When node k−1 receives the control message from node k, it will set its rate limiter value, namely, the allowed-rate based on the control message value, and then send a control message to the other upstream nodes with the value according to the following:
 (a) Minimum of my-rate [k−1] and the received control message value if node k−1 is congested.
 (b) A Null value if node k−1 is not congested.
 (c) A Null value if node k−1 is congested, but my-rate [k−1]>forward-rate [k−1] because node k−1 is the cause for congestion.

When a node 106 receives a control message with a NULL value, it will increase its allowed-rate to reclaim the unused bandwidth.

Figure 4:
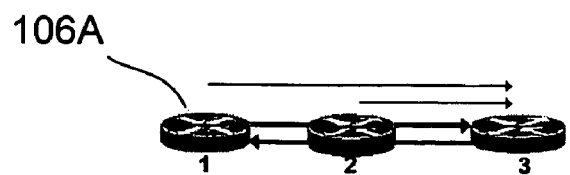
FIG. 4 is a schematic diagram of an RPR ring having a data flow under the well known parking lot scenario.
Figure 5A:
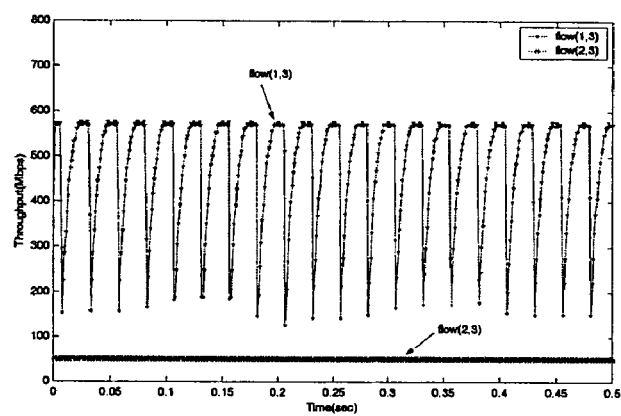
FIG. 5A is a graphical illustration of the RPR ring of FIG. 4 using the aggressive mode.
Figure 5B:
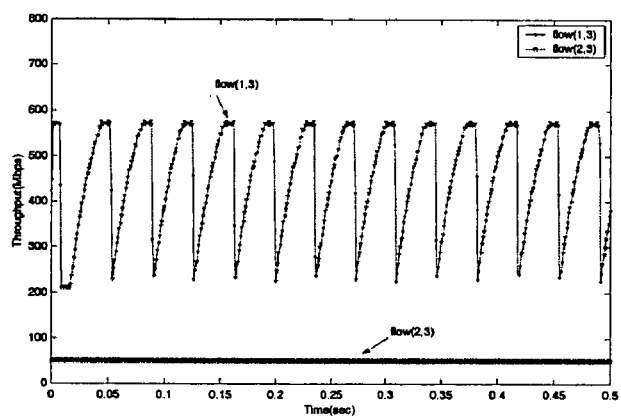
FIG. 5B is a graphical illustration of the RPR ring of FIG. 4 using the conservative mode.

In view of the foregoing, reference is now made to FIGS. 4, 5A and 5B, which illustrate the simple parking lot scenario. As shown in FIG. 4, the flow from node 1 to node 3 is relatively high (greedy) while the flow from node 2 to node 3 is at a relatively low rate (e.g., 50 Mbps). (Assume that both links have a capacity of 622 Mbps.) In the case of using the aggressive mode FIG. 5A, node 2 will be congested when the sum of its rate and the rate of flow (1, 3) is greater than the link capacity. At that point, node 2 sends a fairness control message with its my-rate of 50 Mbps to node 1. In response node 1 throttles its allowed-rate to 50 Mbps. When the congestion is resolved, node 2 sends a fairness control message with a NULL value, signaling node 1 that it can increase its rate to claim the unused bandwidth until congestion occurs again starting a new cycle of oscillation.

On the other hand, using the conservative mode FIG. 5B, node 2 will send the fairness control message with the fair rate equal to the link capacity divided by the number of active nodes (in this case, 2). When the congestion is resolved, node 2 sends the fairness control message with a NULL value so that node 1 can increase its rate to claim the unused bandwidth until the congestion occurs again.

Both modes, RPR-AM and RPR-CM, incur oscillations in the allocated bandwidth, resulting in a bandwidth loss.

In accordance with one or more embodiments of the present invention, however, the DBA fairness algorithm does not require per-source information that can achieve a performance compatible with DVSR but with a much lower computational complexity of O(1).

The Distributed Bandwidth Allocation (DBA) algorithm adopts the Ring Ingress Aggregated with Spatial Reuse (RIAS) fairness concept where the level of traffic granularity at a link is defined as an ingress-aggregated (IA) flow, i.e., the aggregate of all flows originated from the same node but destined to different nodes. At the state of congestion, all nodes should be able to send the same amount of data on the congested link relative to the other nodes. Below consideration is given to the outer ringlet 104 with N nodes numbered from 0 to N−1 along the ring direction. It is understood, however, that the DBA algorithm applies to either ringlet 102, 104.

The available bandwidth for the best effort traffic (Class C) is defined as $$C = \text{Link\_Capacity} - \text{reserved\_BW}, \tag{1}$$

where reserved_BW is the bandwidth reserved for the higher priority class traffic.

At node k, the ingress aggregated traffic demand of node i during a measurement interval T is defined as follows:

$$R_i = \sum_{j=(k+1) \bmod N}^{(i-1) \bmod N} r_{i,j} \tag{2}$$

That is, $R_i$ is equal to the sum of all flows $r_{i,j}$ originated from node i, traversing through node k, and destined to node j.

According to the (RIAS) fairness concept, the fair share at link k is:

$$F_k(n) = \frac{C - B(n)}{w(n)}, \tag{3}$$

where B(n) is the sum of the arrival rates of flows bottlenecked elsewhere or at their ingress points at time n and w(n) is the number of flows bottlenecked at link k. Here, we have adopted the same index to a particular node and link, i.e., link k refers to the link in the direction of the traffic flow of node k. Unfortunately, this calculation requires dynamic per-source information as in DVSR, see V. Gambiroza, P. Yuan, L. Balzano, Y. Liu, S. Sheafor, and E. Knightly, "Design, Analysis, and Implementation of DVSR: A Fair, High Performance Protocol for Packet Rings," IEEE/ACM Transactions on Networking, 12(1):85102, February 2004.

In accordance with the DBA algorithm, each node i will send through link k at a rate according to the received fair rate from node k. Thus, the rate of source i through link k at time n is:

$$R_i(n) = \rho_i F_k(n), \tag{4}$$

where $\rho_i$ is the activity level of source i with respect to the fair rate, $F_k(n)$, of the current interval. The activity level is equal to one for flows bottlenecked at link k, and less than one for flows bottlenecked elsewhere.

M is defined as the number of flows traversing link k, and the arrival rate $\tilde{A}(n)$ at link k can be expressed as a function of the link fair rate $F_k(n)$ as follows:

$$\tilde{A}(n) = \sum_{i=1}^{M} R_i \tag{5}$$
$$= \sum_{i=1}^{M} \rho_i F_k(n)$$
$$= F_k(n) \sum_{i=1}^{M} \rho_i.$$

From equation (5), it can be seen that the arrival rate $\tilde{A}(n)$ is a continuous, non-decreasing and concave function of the link fair rate $F_k(n)$. This general relationship is illustrated in FIG. 6.

Figure 6:
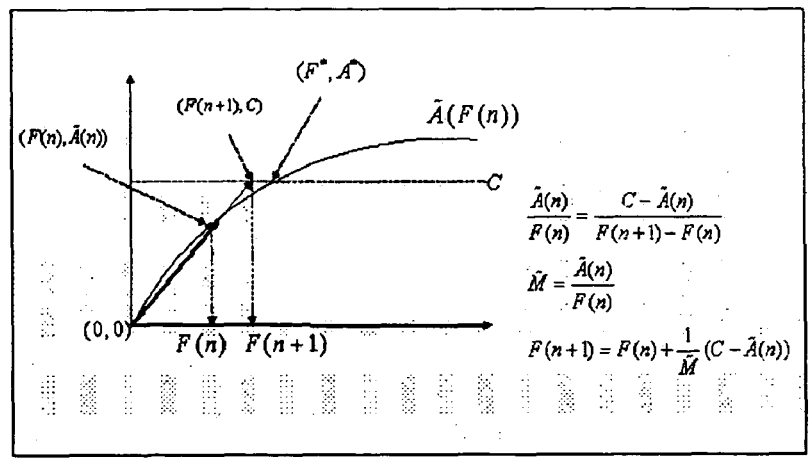
FIG. 6 is a graphical illustration of the relationship between the arrival rate $A(n)$ and the fair rate $F_k(n)$ of the RPR ring.

As shown in FIG. 6, a line connects the current point ($F_k(n)$, $\tilde{A}(n)$) with the origin and intersects with the line representing the available bandwidth C at the new estimated fair rate $F_k(n+1)$. $\tilde{M}$ is defined as the effective number of flows traversing link k:

$$\tilde{M} = \sum_{i=1}^{M} \rho_i. \tag{6}$$

The effective number of flows is the sum of the activity levels of flows traversing link k and is less than or equal to the number of flows M. The effective number of flows can be estimated by a linear function that connects the origin and ($F_k(n)$, $\tilde{A}(n)$) as shown in FIG. 6.

$$\tilde{M} = \frac{\tilde{A}(n)}{F_k(n)}. \tag{7}$$

Among the goals of the DBA fairness algorithm is to maximize the link fair rate $F_k(n)$ subject to the constraint:

$$\tilde{A}(n) \leq C. \tag{8}$$

Thus, the following formula is established to estimate the link fair rate:

$$F_k(n+1) = F_k(n) + \frac{1}{\tilde{M}}(C - \tilde{A}(n)); \tag{9}$$

DBA first estimates the effective number of flows, which can be estimated by the slope of the line connecting the origin and the current point ($F_k(n),\tilde{A}(n)$). Then, it uses equation (9) to estimate the fair rate of the next interval. The goal is to adjust $F_k(n)$ so that the total arrival rate $\tilde{A}(n)$ matches the available bandwidth and $F_k(n)$ converges to the optimal fair rate $F_k^*$.

Note that one of the features of the DBA algorithm is its low computation complexity of O(1), thus making DBA scalable for a ring network with any number of nodes, i.e., independent of N. Moreover, DBA does not require per-source information as in DVSR.

The pseudo code for the DBA, where the total arrival rate $\tilde{A}(n)$ is updated at the arrival of every packet traversing link k, may be expressed as follows:

Initialization: at the beginning of every measurement interval T, reset $\tilde{A}(n)$;

Begin Measurement interval: at the arrival of a packet from node i with length L bytes $\tilde{A}(n)=\tilde{A}(n)+L$ End Measurement Interval: The effective number of active flows is:

$$\tilde{M} = \max\left(1, \frac{\tilde{A}(n)}{F_k(n)}\right),$$

and the advertised fair rate is:

$$F_k(n+1) = F_k(n) + \frac{1}{\tilde{M}}(C - \tilde{A}(n)).$$

At the end of the measurement interval T, equations (7) and (9) are used to calculate the next advertised fair rate $F_k(n+1)$.

The convergence of the DBA algorithm will now be discussed. Let k be the bottlenecked link. The number of flows traversing link k is M, where M' is the number of flows bottlenecked elsewhere or at their ingress points, and M''=M−M' is the number of flows bottlenecked at link k. Let $R_{b1}$, $R_{b2}, \ldots, R_{bM'}$ be the flows bottlenecked elsewhere, and $R_1$, $R_2, \ldots, R_{M'}$ be the flows bottlenecked at link k. At the end of the nth measurement interval (t=nT), the effective number of flows is estimated as:

$$\tilde{M} = \frac{\tilde{A}(n)}{F_k(n)} \tag{10}$$

where $$\tilde{A}(n) = \sum_{i=1}^{M} R_i$$

is the arrival rate at node k, and $F_k(n)$ is the advertised fair rate of the previous interval.

The next advertised fair rate is:

$$F_k(n+1) = F_k(n) + \frac{1}{\tilde{M}}(C - \tilde{A}(n)) \tag{11}$$

Substituting equation (10) into equation (11) yields:

$$F_k(n+1) = F_k(n)\frac{C}{\tilde{A}(n)} \tag{12}$$

Define $$\alpha(n) = \frac{\tilde{A}(n)}{C}$$

as the load factor, and rewrite equation (12) as follows:

$$F_k(n+1) = \frac{F_k(n)}{\alpha(n)} \tag{13}$$

According to the load factor value, two cases are considered. First, consider the case where the load factor $\alpha(n)$ is less than one. In this case, the arrival rate is less than the available bandwidth and the link is under-loaded. According to equation (13), the advertised fair rate will increase. If all flows are bottlenecked elsewhere (M''=0), the fair rate has been achieved. On the other hand, if there are some flows bottlenecked at link k (M''>0), the bottlenecked flows will continue to increase their rates until the load factor becomes greater than or equal to one.

Second, consider the case where the load factor $\alpha(n)$ is greater than one. In this case, the arrival rate is greater than the available bandwidth and the link is over-loaded. According to equation (13), the advertised fair rate will decrease and the participating flows will decrease their rates. This will continue until the load factor becomes less than or equal to one.

It is apparent from the above two cases that the load factor oscillates around one and converges to one. Thus, in the following analysis, it is assumed that the load factor is close to one.

Next, it will be established that the iterative algorithm equation (11) will generate a sequence of $F_k(n)$ that will converge to the optimal value of the advertised fair rate $$F_k^* = \frac{C - \sum_{i=1}^{M'} R_{bi}}{M''}.$$

Note that the iterative equation (11) is in the form of:

$$F_k(n+1) = F_k(n) + \lambda [\nabla^2 D(F_k(n))]^{-1} \nabla D(F_k(n)) \quad (14)$$

That is, the link fair rate is adjusted in the direction of the gradient, where $$\nabla D(F_k(n)) = C - \tilde{A}(F_k(n)) \quad (15)$$

Here, $\lambda$ is a positive step size, and in our case is equal to one, and $[\nabla^2 D(F_k(n))]^{-1}$ is the inverse of the Hessian.

It is well known that the Newton method equation (11), where the gradient is scaled by the inverse of the Hessian typically converges faster than the gradient projection. The Hessian $\nabla^2 D(F_k(n)) = \tilde{M}$ is approximated by using two points, the current point of $(\tilde{A}(n), F_k(n))$ and the origin $(0, 0)$. Hence, the above iterative equation converges, and the stable value of the link advertised fair rate is detailed as follows:

First, assume that all the flows are bottlenecked at link k. In this case, M'=0 and M''=M. All flows are running at the fair rate $R_i(n) = F_k(n)$, and the total arrival rate at node k is:

$$\tilde{A}(n) = F_k(n) \sum_{i=1}^{M} \rho_i \quad (16)$$

Since all flows are bottlenecked at link k, the effective number of flows is $$\sum_{i=1}^{M} \rho_i = M.$$

Substituting the value of $\tilde{A}(n)$ into equation (12) with a load factor $\alpha(n)$ of one at the steady state yields:

$$F_k(n+1) = \frac{C}{M} \quad (17)$$

which is the desired value for $F_k$.

Finally, assume that some flows are bottlenecked elsewhere. These flows will have their rates $R_{b1}, R_{b2}, \ldots, R_{bM'}$ stabilized, and the allocated bandwidth for these flows is $$B = \sum_{i=1}^{M'} R_{bi}.$$

Since we have a load factor $\alpha(n)$ of one at the steady state, we have:

$$\sum_{i=1}^{M'} R_i = C - \sum_{i=1}^{M'} R_{bi} \quad (18)$$

and $$\sum_{i=1}^{M'} R_i = M'' F_k(n) \quad (19)$$

Substituting equation (19) into equation (18) yields:

$$F_k(n) = \frac{C - \sum_{i=1}^{M'} R_{bi}}{M''} \quad (20)$$

Substituting the value of $F_k(n)$ into equation (13) yields:

$$F_k(n+1) = \frac{C - \sum_{i=1}^{M'} R_{bi}}{M''} \quad (21)$$

which is indeed the desired value for $F_k$ and the proof is complete.

At the end of every measurement interval T, every participating node k will broadcast a control message containing the value of the last computed fair rate $_k$. Thus, every participating node is aware of the supported fair rates at all links.

Upon receiving all the last computed fair rates, the node itself will do sub-allocation for all the flows that are sharing the same link and are destined to different egress nodes to support virtual destination queuing in order to achieve per flow fairness and avoid head of line blocking (HLB).

Results of the DBA algorithm will now be considered, which may be expressed in three scenarios. First considered is the parking lot scenario, which demonstrates the performance of the DBA algorithm in achieving fairness. Second, the convergence of the DBA algorithm is demonstrated even in the unbalanced traffic scenario. Finally, the performance of the DBA algorithm is studied in the presence of different traffic models. All simulation results are obtained by using a well known RPR simulator.

Figure 7:
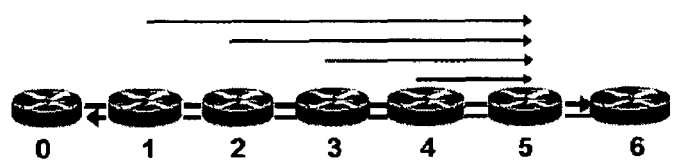
FIG. 7 is a schematic diagram of an alternative RPR ring having a data flow under the parking lot scenario.
Figure 8A:
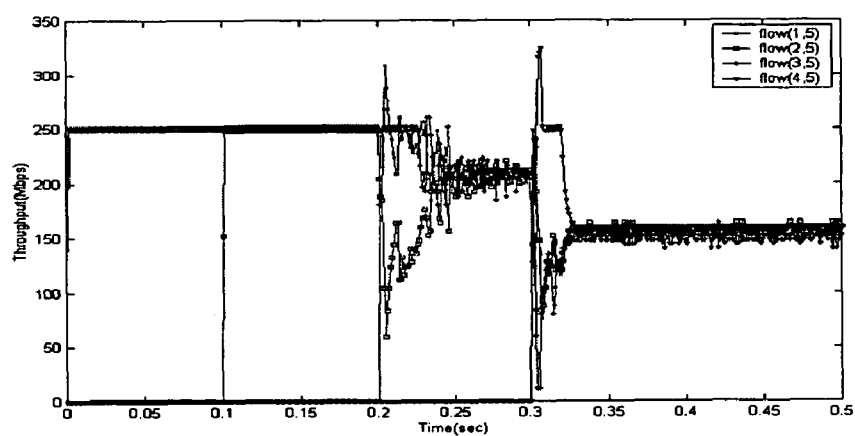
FIG. 8A is a graphical illustration of the RPR ring of FIG. 7 using the aggressive mode.
Figure 8B:
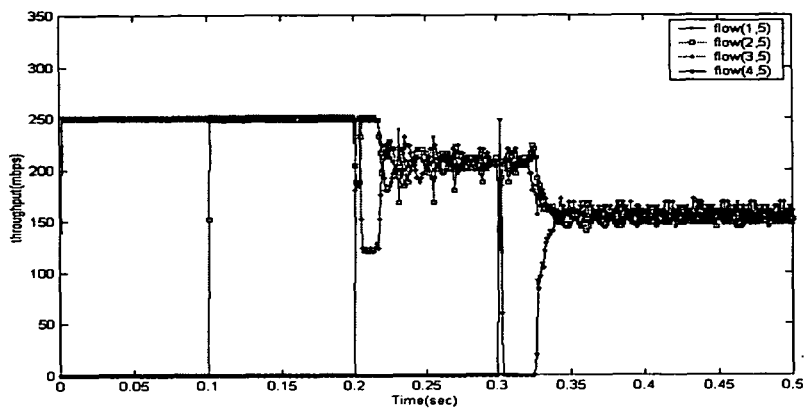
FIG. 8B is a graphical illustration of the RPR ring of FIG. 7 using the conservative mode.
Figure 8C:
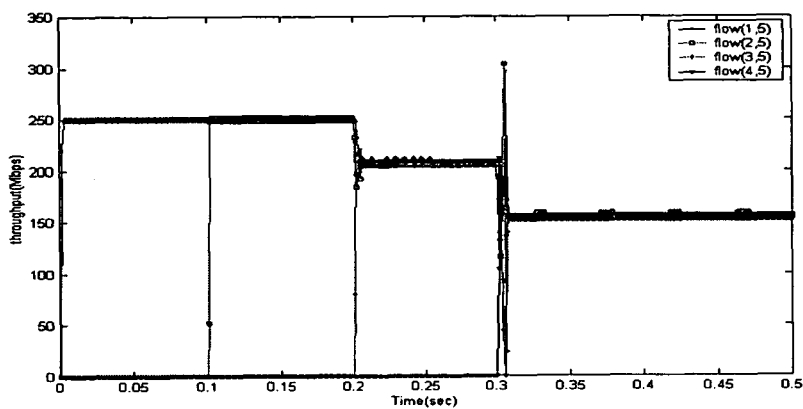
FIG. 8C is a graphical illustration of the throughput of the RPR ring of FIG. 7 and shows that DVSR needs only a few milliseconds to converge to the RIAS fair rate, with $O(N \log N)$ computational complexity.
Figure 8D:
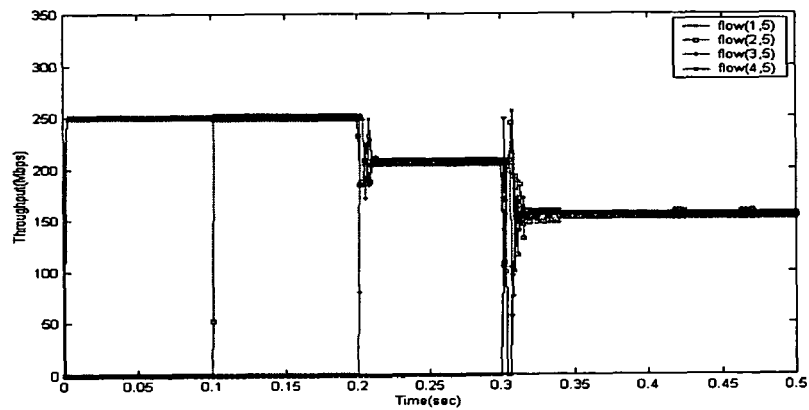
FIG. 8D is a graphical illustration of the throughput of the RPR ring of FIG. 7 using the DBA algorithm, which converges to the RIAS fair rates in a few measurement intervals with a low computational complexity of $O(1)$.

FIG. 7 shows the parking lot scenario. In this experiment, comparisons of the convergence times of the fairness algorithms were obtained. The links have the same capacity of 622 Mbps, and each link has a propagation delay of 0.1 ms. All flows are UDP flows, with a rate equal to 250 Mbps. The flows, flow(1,5), flow(2,5), flow(3,5) and flow(4,5) start at time 0, 0.1, 0.2 and 0.3 seconds, respectively. The measurement time interval is set to T=1 ms. The performance of the RPR fairness algorithms RPR-AM and RPR-CM are shown in FIGS. 8A and 8B, respectively. In both algorithms, flows oscillate for a significant period of time before converging to the fair rate. Moreover, the range of oscillation is large. The results shown in FIG. 8C exhibit that DVSR needs only a few milliseconds to converge to the RIAS fair rate, however, at the expense of O(N log N) computational complexity; it also requires per-source information. Simulations shown in FIG. 8D have verified that DBA converges to the RIAS fair rates in a few measurement intervals with a very low computational complexity of O(1), and it does not require per-source information as compared to DVSR. The oscillation has also been significantly reduced.

Figure 9:
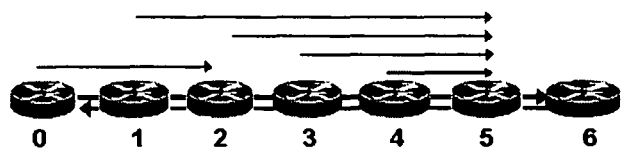
FIG. 9 is a schematic diagram of an alternative RPR ring having a data flow under the available bandwidth re-claim scenario (where all flows are greedy and start at time t=0)
Figure 10A:
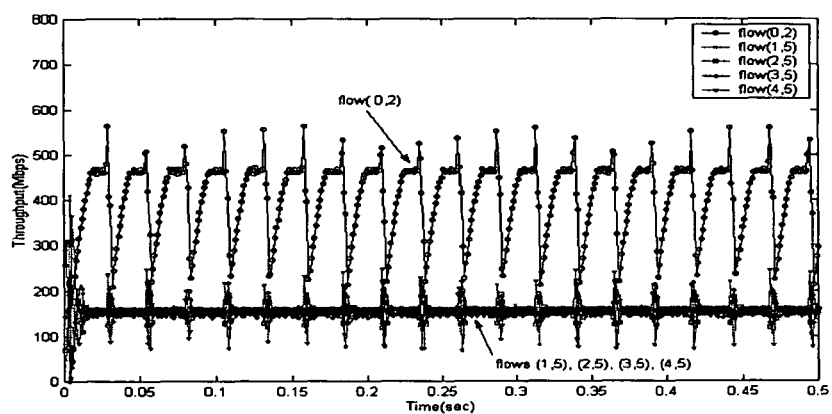
FIG. 10A is a graphical illustration of the throughput of the RPR ring of FIG. 9 in the aggressive mode.

The Available Bandwidth Re-claim Scenario is shown in FIG. 9, where all flows are greedy and start at time t=0. FIG. 10A shows the RPR-AM algorithm where all the flows (0,2), (1,5), (2,5), (3,5) and (4,5) start at time 0 second. After some time, due to the congestion experienced at link 4, flows (1,5), (2,5), (3,5) and (4,5) will converge to the fair rate (155.5 Mbps). Meanwhile node 0 starts to reclaim the unused bandwidth at link 1. When node 1 becomes congested, it sends my-rate value of 155.5 Mbps to node 0, thus throttling flow (0,2) to 155.5 Mbps. When the congestion at node 1 is cleared, node 0 starts to increase its rate again starting another cycle of oscillation.

Figure 10B:
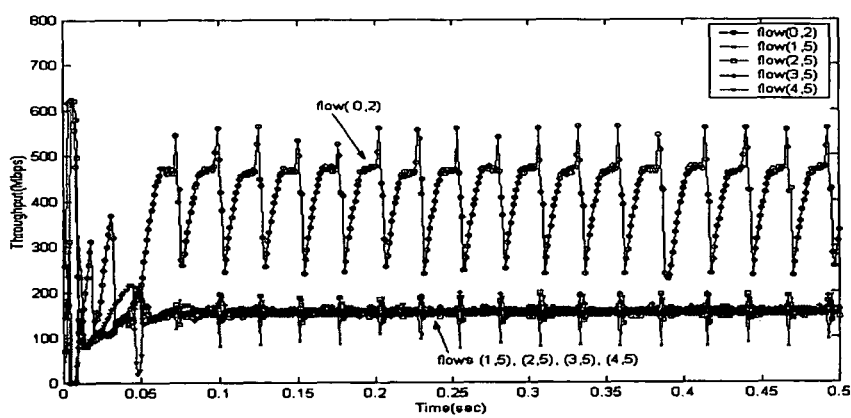
FIG. 10B is a graphical illustration of the throughput of the RPR ring of FIG. 9 in the conservative mode.
Figure 10C:
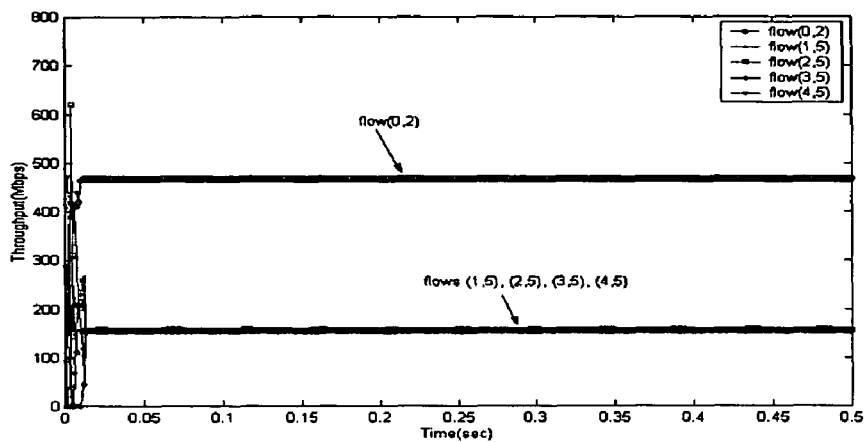
FIG. 10C is a graphical illustration of the throughput of the RPR ring of FIG. 9 showing that the DVSR converges very fast to the RIAS fair rate at the expense of a high computational complexity.
Figure 10D:
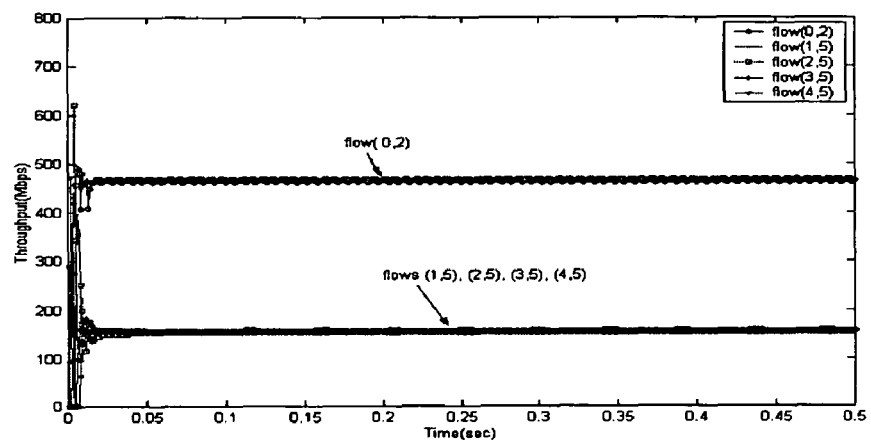
FIG. 10D is a graphical illustration of the throughput of the RPR ring of FIG. 9 showing the DBA algorithm converges very fast to the RIAS fair rate with damped oscillation.

Using the RPR-CM algorithm, FIG. 10B, node 1 will send my-rate value equal to the available bandwidth divided by the number of sources using link 1 (two in this case). Thus, flow (0,2) will be throttled to 311 Mbps. When the congestion at node 1 is cleared, node 0 starts to increase its rate again starting another cycle of oscillation. FIG. 10C shows that DVSR converges very fast to the RIAS fair rates at the expense of a high computational complexity and the need for per-source information. Using the DBA algorithm, nodes converge very fast to the RIAS fair rates. Moreover, the oscillation is significantly damped, as shown in FIG. 10D.

Figure 11:
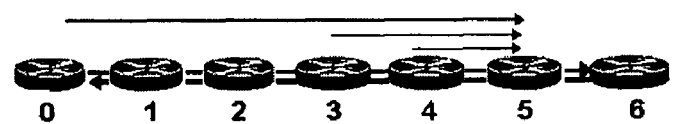
FIG. 11 is a schematic diagram of an alternative RPR ring having a data flow under the different traffic models scenario (where the congested link is shared by different traffic models)
Figure 12:
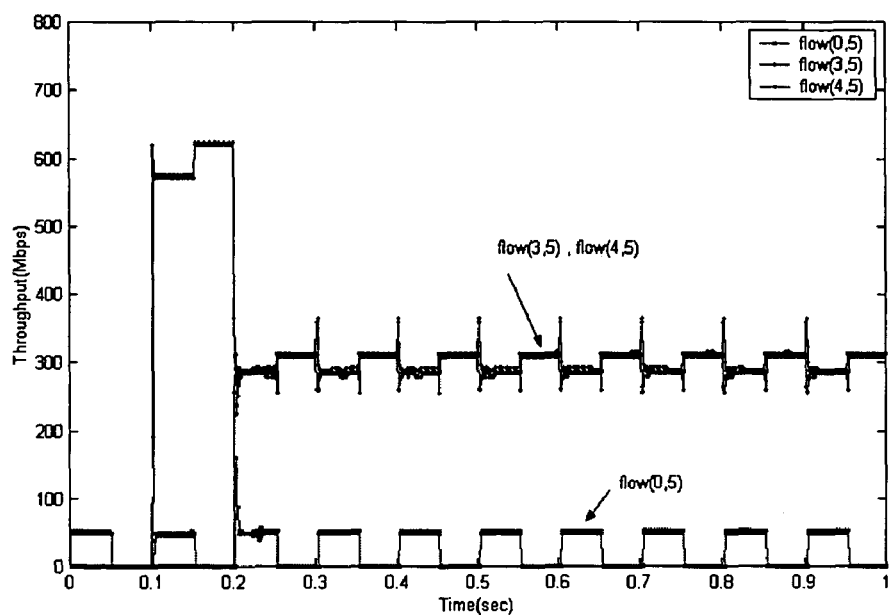
FIG. 12 is a graphical illustration of the throughput of the RPR ring of FIG. 11 showing that the DBA algorithm reacts responsively to the presence of the ON/OFF flow, and converges very fast to the RIAS fair rate.

In the Different traffic models experiment, FIG. 11, the congested link is shared by different traffic models. Flows (3,5) and (4,5) are greedy UDP flows and start at time 0.1 and 0.2 seconds, respectively. Flow (0,5) is an ON/OFF flow. During the ON period, flow (0,5) sends at a rate equal to 50 Mbps. FIG. 12 shows that the DBA algorithm reacts responsively to the presence of the ON/OFF flow, and converges very fast to the RIAS fair rates.

In accordance with one or more further embodiments of the present invention, the relationship between the arrival rate $\tilde{A}(n)$ and the fair rate $F_k(n)$ may be exploited in an alternative way to estimate the next fair rate $F_k(n+1)$ at the end of every time interval T. The bandwidth allocation algorithm in accordance with this embodiment of the present invention may be referred to as the Low Complexity Distributed Bandwidth Allocation (LCDBA) algorithm. This algorithm also adopts the RIAS fairness concept, where the level of traffic granularity at a link is defined as an ingress-aggregated (IA) flow, i.e., the aggregate of all flows originated from the same node but destined to different nodes. At the state of congestion, all nodes should be able to send the same amount of data on the congested link relative to the other nodes.

Again, we consider only one of the two rings, the inner ring with N nodes numbered from 0 to N−1 along the ring direction. Each node k uses per ingress byte counters to measure the traffic demand from every node over the measurement interval T.

At node k, the ingress aggregated traffic demand of node i during a measurement interval T is defined as follows:

$$B_i = \sum_{j=(k+1) \bmod N}^{(i-1) \bmod N} b_{i,j} \quad (22)$$

That is, $B_i$ is equal to the sum of all flows $b_{i,j}$ originated from node i, traversing through node k, and destined to node j. Since T is fixed, we will interchangeably refer to a traffic demand in bytes from a node as a rate. At the end of the measurement interval, these rates are compared with the advertised fair rate $F_k$ in bytes during the previous interval to measure the activity level of all nodes. This concept has been previously proposed to measure the flow activity level of the ABR services in ATM Networks.

The node i activity with respect to node k is defined as $$\min\left(1, \frac{B_i}{F_k}\right) \quad (23)$$

From this definition, node i is considered to be fully active if it transmits at the advertised fair rate $F_k$ or higher. Otherwise, it will be considered as partially active. When the activity level of the node is 0, this implies that the node is not sending any packets through node k, and it is thus considered to be not active.

The effective number of active nodes at node k, $\tilde{N}_k$, is defined as:

$$\tilde{N}_k = \sum_{i=0, i \neq k+1}^{N-1} \min\left(1, \frac{B_i}{F_k}\right) \quad (24)$$

where N is the number of nodes in the ring. $\tilde{N}_k$ is less than or equal to N−1. Note that node k+1 is not sending data through node k, and thus the sum in equation (24) does not include k+1.

The advertised fair rate at node k is:

$$F_k = \frac{C}{\max\left(1, \sum_{i=0, i \neq k+1}^{N-1} \min\left(1, \frac{B_i}{F_k}\right)\right)} \quad (25)$$

where C is the available bandwidth in bytes during the measurement interval. The available capacity C is defined:

C=LinkCapacity−reservedBW, where reservedBW is the bandwidth reserved for the higher priority class traffic. From this equation, the denominator will exhibit three cases, thus resulting in the following three lemmas.

Lemma 1: When all nodes are sending data at the advertised fair rate $F_K$ or higher, the new calculated advertised fair rate is the fair share:

$$F_k = \frac{C}{N-1}$$

In this case, the denominator of equation (25) becomes:

$$\max\left(1, \sum_{i=0, i \neq k+1}^{N-1} \min\left(1, \frac{B_i}{F_k}\right)\right) = N-1$$

Thus, we have the stated fair rate.

Lemma 2: When all the nodes are not sending (not active), the new calculated advertised fair rate is:

$$F_k = \frac{C}{\max\left(1, \sum_{i=0, i\neq k+1}^{N-1} \min\left(1, \frac{B_i}{F_k}\right)\right)} = C$$

In this case, the denominator of equation (25) becomes:

$$\max\left(1, \sum_{i=0, i\neq k+1}^{N-1} \min\left(1, \frac{B_i}{F_k}\right)\right) = 1$$

Here, the advertised fair rate $F_k$ of node k is not higher than the available capacity.

Lemma 3: When some nodes are not active or sending at rate less than the advertised rate $F_k$, the new calculated advertised fair rate is:

$$F_k > \frac{C}{N-1}$$

In this case, the denominator of equation (25) becomes $$\max\left(1, \sum_{i=0, i\neq k+1}^{N-1} \min\left(1, \frac{B_i}{F_k}\right)\right) < N-1$$

Thus, nodes that are blocked at node k, but are not blocked elsewhere will be able to increase their rates and claim the unused bandwidth left by the other nodes that are blocked elsewhere or at their ingress points. The advertised fair rate calculation, equation (25), has a computational complexity of O(N).

Since the advertised fair rate computation depends on the sum of the individual node activity, we can further simplify the computation as follows:

$$\tilde{N}_k = \min\left(1, \frac{B_k}{F_k}\right) + \frac{\sum_{i=0, i\neq \{k, k+1\}}^{N-1} \min(F_k, B_i)}{F_k} \quad (26)$$

Thus, $A_k$, the total activity of all upstream nodes at node k, is:

$$A_k = \sum_{i=0, i\neq \{k, k+1\}}^{N-1} \min(F_k, B_i) \quad (27)$$

The pseudo code for the LCDBA may be expressed as follows:

Initialization: at the beginning of every measurement interval T, reset $A_k$ and $B_i$ for i=0,1 ... N−1;

During the measurement interval: At the arrival of a packet from node i with length L bytes to the Transit buffer $A_k = A_k + \min(L_i, \max(0, F_k - B_i))$ $B_i = B_i + L_i$ At the arrival of a packet from node k with length L bytes to the Transmit buffer:

$B_k = B_k + L_k$

At the end of the measurement interval, the advertised fair rate calculation is computed:

$$F_k = \frac{C}{\max(1, \tilde{N}_k)},$$

where, the effective number of active nodes is:

$$\tilde{N}_k = \min\left(1, \frac{B_k}{F_k}\right) + \frac{A_k}{F_k}.$$

The pseudo code for the LCDBA exhibits a computational complexity of the advertised fair rate of O(1), thus making LCDBA scalable for a ring network with any number of nodes, i.e., independent of N.

At the end of every measurement interval T, every node k will broadcast a control message containing the value of the last computed fair rate $F_k$. Thus, every node is aware of the supported fair rates at all links.

Upon receiving all the last computed fair rates, the node itself will do sub-allocation for all the flows that are sharing the same link and are destined to different egress nodes to support virtual destination queuing in order to achieve per flow fairness and avoid head of line blocking (HLB).

Two scenarios have been considered in connection with running simulations on the LCDBA. First, the parking lot scenario is considered to show the performance of the LCDBA algorithm in achieving both spatial reuse and fairness. Second, convergence of the LCDBA algorithm is demonstrated even in the unbalanced traffic scenario.

Figure 13:
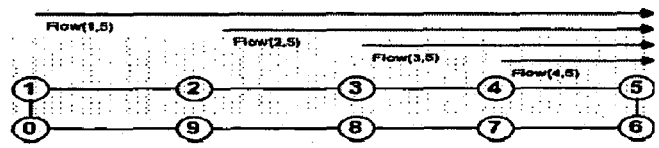
FIG. 13 is a schematic diagram of an alternative RPR ring having a data flow under the parking lot scenario.
Figure 14:
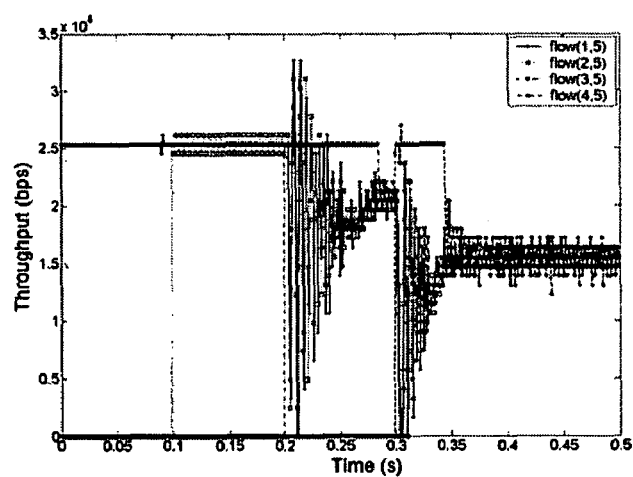
FIG. 14-15 are graphical illustrations of the throughput and the convergence of the RPR ring of FIG. 13 using DVSR algorithm.
Figure 15:
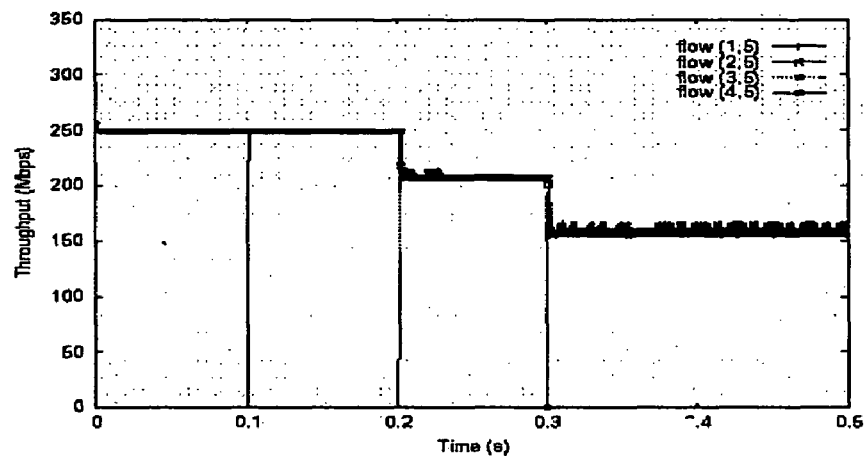
Figure 16:
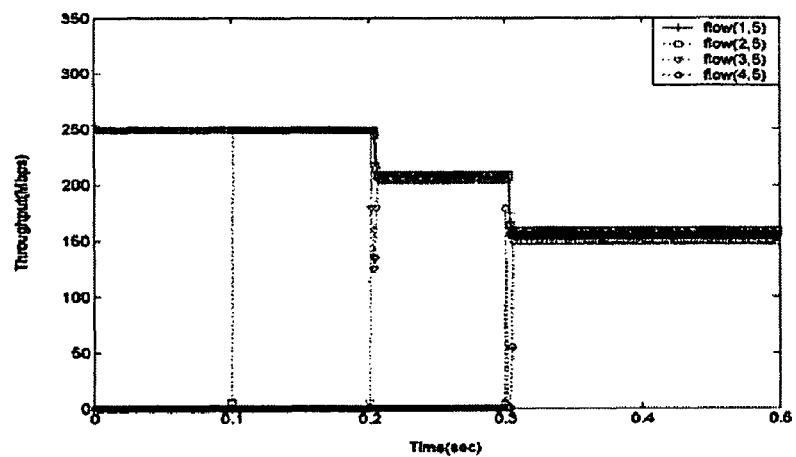
FIG. 16 is a graphical illustration of the throughput of the RPR ring of FIG. 13 using the LCDBA algorithm, which converges to the RIAS fair rates in a few measurement intervals with a low computational complexity of O(1)

FIG. 13 shows the parking lot scenario. In this experiment, the convergence time of the fairness algorithms are compared. The links have the same capacity of 622 Mbps, and each link has a propagation delay of 0.1 ms. All flows are UDP flows, with a rate equal to 248.8 Mbps. The flows, flow(1,5), flow(2,5), flow(3,5) and flow(4,5) start at time 0, 0.1, 0.2 and 0.3 seconds, respectively. The measurement time interval was set to T=1 ms. As shown in FIG. 14, the RPR algorithm needs 50 ms to converge due to a large number of control message exchanges between congested node 4 and the upstream nodes until it converges to the fair rate. Moreover, the range of oscillation is large. The simulation graph in FIG. 15 exhibits that DVSR needs a few milliseconds to converge to the RIAS faire rate at the expense of O(N log N) computational complexity. Simulations shown in FIG. 16 have verified that the LCDBA converges to the RIAS fair rate in a few measurement intervals at a very low computational complexity of O(1) as compared to DVSR. The oscillation has also been significantly reduced.

Figure 17:
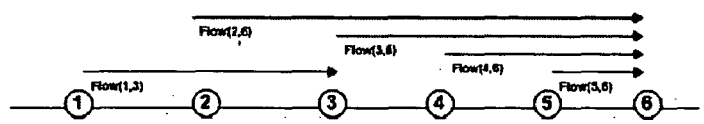
FIG. 17 is a schematic diagram of an alternative RPR ring having a data flow under the available bandwidth re-claim scenario.
Figure 18A:
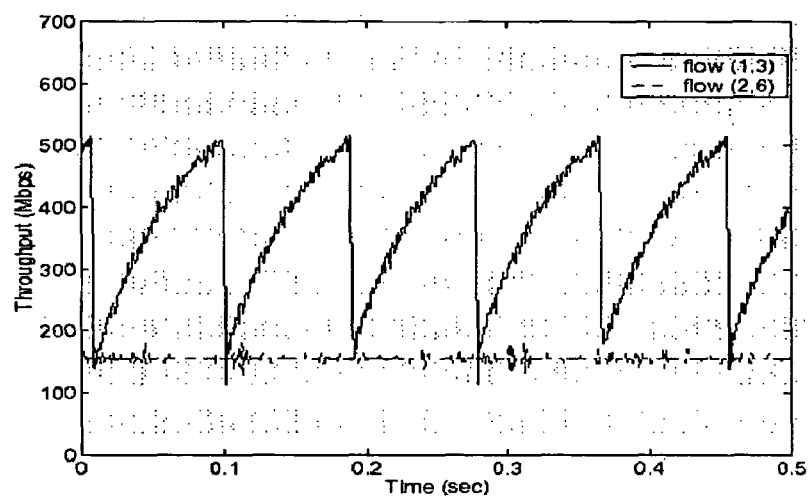
FIGS. 18A-B are graphical illustrations of the throughput of the RPR ring of FIG. 17 using the LCDBA algorithm.
Figure 18B:
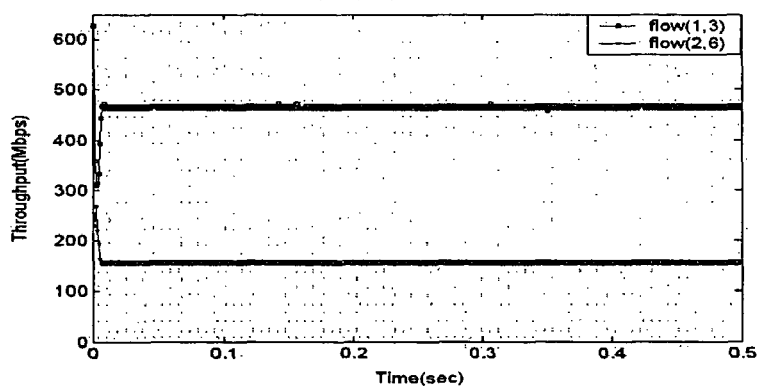

The available bandwidth re-claim scenario was also considered in which all flows are greedy and start at time t=0. This scenario is illustrated in FIG. 17. FIGS. 18A-B show the RPR-AM algorithm where all the flows (1,3), (2,6), (3,6), (4,6) and (5,6) start at time 0 seconds. Only flow(2,6) and flow(1,3) are shown in the figure, and flow(3,6), flow(4,6), and flow(5,6) behave similarly to that of flow(2,6).

After some time, flows (2,6), (3,6), (4,6) and (5,6) will converge to the fair rate (155 Mbps) due to the congestion experienced at node 5, meanwhile, node 1 starts to reclaim the unused bandwidth at link 2. When node 2 becomes congested, it sends my-rate value of 155 Mbps to node 1, thus throttling flow (1,3) to 155 Mbps. When the congestion at node 2 is cleared, node 1 starts to increase its rate again starting another cycle of oscillation. Using the LCDBA algorithm, nodes converge very fast to the RIAS fair rates. Moreover, the oscillation is significantly damped, as shown in FIG. 18A-B.

In accordance with at least one further aspect of the present invention, the methods and apparatus described above may be achieved utilizing suitable hardware, such as that illustrated and/or inherently implied in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of allocating bandwidth in a resilient packet ring (RPR), comprising:
   determining a relationship, $A(F_k(n))$, between an arrival rate $A(n)$ and a fairness rate $F_k(n)$ of a kth node of the RPR over time;
   computing an estimate of a slope M of the relationship $A(F_k(n))$ with respect to $F_k(n)$;
   computing a next fairness rate $F_k(n+1)$ at a time n+1 of the kth node as a function of the slope M; and
   providing the next fairness rate $F_k(n+1)$ to another node in the RPR to be used by the other node to adjust its bandwidth.

2. The method of claim 1, wherein the arrival rate $A(n)$ may be expressed as: $A(n)=F_k(n)\Sigma\rho_i$ (i=1 to M'), where M' is a number of flows traversing a forward link k into the kth node of the RPR.

3. The method of claim 1, wherein the slope M may be expressed as at least one of: $M=A(n)/F_k(n)$; and $M=\Sigma\rho_i$ (i=1 to M'), where M' is a number of flows traversing a forward link k into the kth node of the RPR.

4. The method of claim 1, wherein the step of computing the next fairness rate $F_k(n+1)$ includes substantially maximizing the $F_k(n+1)$ while constraining a resultant next arrival rate $A(n+1)$.

5. The method of claim 1, wherein a constraint on the next arrival rate $A(n+1)$ may be expressed as follows: $A(n+1)\leq C$, where C is at least a link capacity of a forward link k into the kth node of the RPR.

6. The method of claim 5, wherein C is the link capacity less any reserved bandwidth of other data traffic.

7. The method of claim 6, wherein the other data traffic is higher priority traffic.

8. The method of claim 1, wherein the step of computing the next fairness rate $F_k(n+1)$ may be expressed as follows: $F_k(n+1)=F_k(n)+(1/M)(C-A(n))$ where C is at least a link capacity of a forward link k into the kth node of the RPR.

9. The method of claim 8, wherein C is the link capacity less any reserved bandwidth of other data traffic.

10. A processor operating at least partially under the control of a program such that the processor executes actions to compute an allocated bandwidth in a resilient packet ring (RPR) by performing the steps of:
    determining a relationship, $A(F_k(n))$, between an arrival rate $A(n)$ and a fairness rate $F_k(n)$ of a kth node of the RPR over time;
    computing an estimate of a slope M of the relationship $A(F_k(n))$ at time n with respect to $F_k(n)$;
    computing a next fairness rate $F_k(n+1)$ at a time n+1 of the kth node as a function of the slope M; and
    providing the next fairness rate $F_k(n+1)$ to another node in the RPR to be used by the other node to adjust its bandwidth.

11. The processor of claim 10, wherein the action of computing the next fairness rate $F_k(n+1)$ may be expressed as follows: $F_k(n+1)=F_k(n)+(1/M)(C-A(n))$ where C is at least a link capacity of a forward link k into the kth node of the RPR.

12. The processor of claim 11, wherein C is the link capacity less any reserved bandwidth of other data traffic.

13. A non-transitory computer-readable medium having instructions stored thereon, the instructions comprising:
    instructions for determining a relationship, $A(F_k(n))$, between an arrival rate $A(n)$ and fairness rate $F_k(n)$ of a kth node of the RPR over time;
    instructions for computing an estimate of a slope M of the relationship $A(F_k(n))$ at time n with respect to $F_k(n)$;
    instructions for computing a next fairness rate $F_k(n+1)$ at a time n+1 of the kth node as a function of the slope M; and
    instructions for providing the next fairness rate $F_k(n+1)$ to another node in the RPR to be used by the other node to adjust its bandwidth.

14. The computer-readable medium of claim 13, wherein the arrival rate $A(n)$ may be expressed as: $A(n)=F_k(n)\Sigma\rho_i$ (i=1 to M'), where M' is a number of flows traversing a forward link k into the kth node of the RPR.

15. The computer-readable medium of claim 13, wherein the slope M may be expressed as at least one of: $M=A(n)/F_k(n)$; and $M=\Sigma\rho_i$ (i=1 to M'), where M' is a number of flows traversing a forward link k into the kth node of the RPR.

16. The computer-readable medium of claim 13, wherein computing a next fairness rate $F_k(n+1)$ includes substantially maximizing the $F_k(n+1)$ while constraining a resultant next arrival rate $A(n+1)$.

17. The computer-readable medium of claim 16, wherein the constraint on the next arrival rate $A(n+1)$ may be expressed as follows: $A(n+1)\leq C$, where C is at least a link capacity of a forward link k into the kth node of the RPR.

18. The computer-readable medium of claim 17, wherein C is the link capacity less any reserved bandwidth of other data traffic.

19. The computer-readable medium of claim 18, wherein the other data traffic is higher priority traffic.

20. The computer-readable medium of claim 13, wherein computing the next fairness rate $F_k(n+1)$ may be expressed as follows: $F_k(n+1)=F_k(n)+(1/M)(C-A(n))$ where C is at least a link capacity of a forward link k into the kth node of the RPR.

21. The computer-readable medium of claim 20, wherein C is the link capacity less any reserved bandwidth of other data traffic.

22. An apparatus for allocating bandwidth in a resilient packet ring (RPR), comprising:

means for determining a relationship, $A(F_k(n))$, between an arrival rate $A(n)$ and a fairness rate $F_k(n)$ of a kth node of the RPR over time;

means for computing an estimate of a slope M of the relationship $A(F_k(n))$ at time n with respect to $F_k(n)$;

means for computing a next fairness rate $F_k(n+1)$ at a time n+1 of the kth node as a function of the slope M; and means for providing the next fairness rate $F_k(n+1)$ to another node in the RPR to be used by the other node to adjust its bandwidth.

\* \* \* \* \*

UNITED STATES PATENT AND TRADEMARK OFFICE
CERTIFICATE OF CORRECTION

| | | |
|---|---|---|
| PATENT NO. | : 7,948,881 B2 | |
| APPLICATION NO. | : 11/403521 | |
| DATED | : May 24, 2011 | |
| INVENTOR(S) | : Alharbi et al. | |

It is certified that error appears in the above-identified patent and that said Letters Patent is hereby corrected as shown below:

On the Title page, item (74), under "Attorney, Agent, or Firm", Line 2, delete "Hutz" and insert -- Hutz LLP --.

On the Title page, item (57), under "Abstract", Line 5, delete "-M" and insert -- M --.

Page 2, item (56), under "Other Publications", Line 9, delete "Agressive" and insert -- Aggressive --.

Page 2, item (56), under "Other Publications", Line 12, delete "Protocal" and insert -- Protocol --.

Page 2, item (56), under "Other Publications", Line 6, delete "Slmulator" and insert -- Simulator --.

Page 2, item (56), under "Other Publications", Line 6, delete "i java; Simular" and insert -- in java; Simula --.

Column 16, line 14, in Claim 10, delete "A($F_k$ (n)),"  and insert -- A($F_k$(n)), --.

Column 16, line 18, in Claim 10, delete "A($F_k$ (n))" and insert -- A($F_k$(n)) --.

Column 16, line 19, in Claim 10, delete "$F_k$ (n+1)" and insert -- $F_k$(n+1) --.

Column 16, line 21, in Claim 10, delete "$F_k$ (n+1)" and insert -- $F_k$(n+1) --.

Column 17, line 7, in Claim 22, delete "A($F_k$ (n))," and insert -- A($F_k$n)), --.

Column 18, line 2, in Claim 22, delete "A($F_k$ (n))" and insert -- A($F_k$(n)) --.

Signed and Sealed this
Fourth Day of October, 2011

David J. Kappos
*Director of the United States Patent and Trademark Office*

CERTIFICATE OF CORRECTION (continued)
U.S. Pat. No. 7,948,881 B2

Column 18, line 3, in Claim 22, delete "Fk (n+1)" and insert -- F$k$(n+1) --.

Column 18, line 5, in Claim 22, delete "F$_k$ (n+1)" and insert -- F$_k$(n+1) --.